No. 832,554. PATENTED OCT. 2, 1906.
C. A. McKINNEY.
POLE.
APPLICATION FILED MAY 27, 1905.
2 SHEETS—SHEET 2.
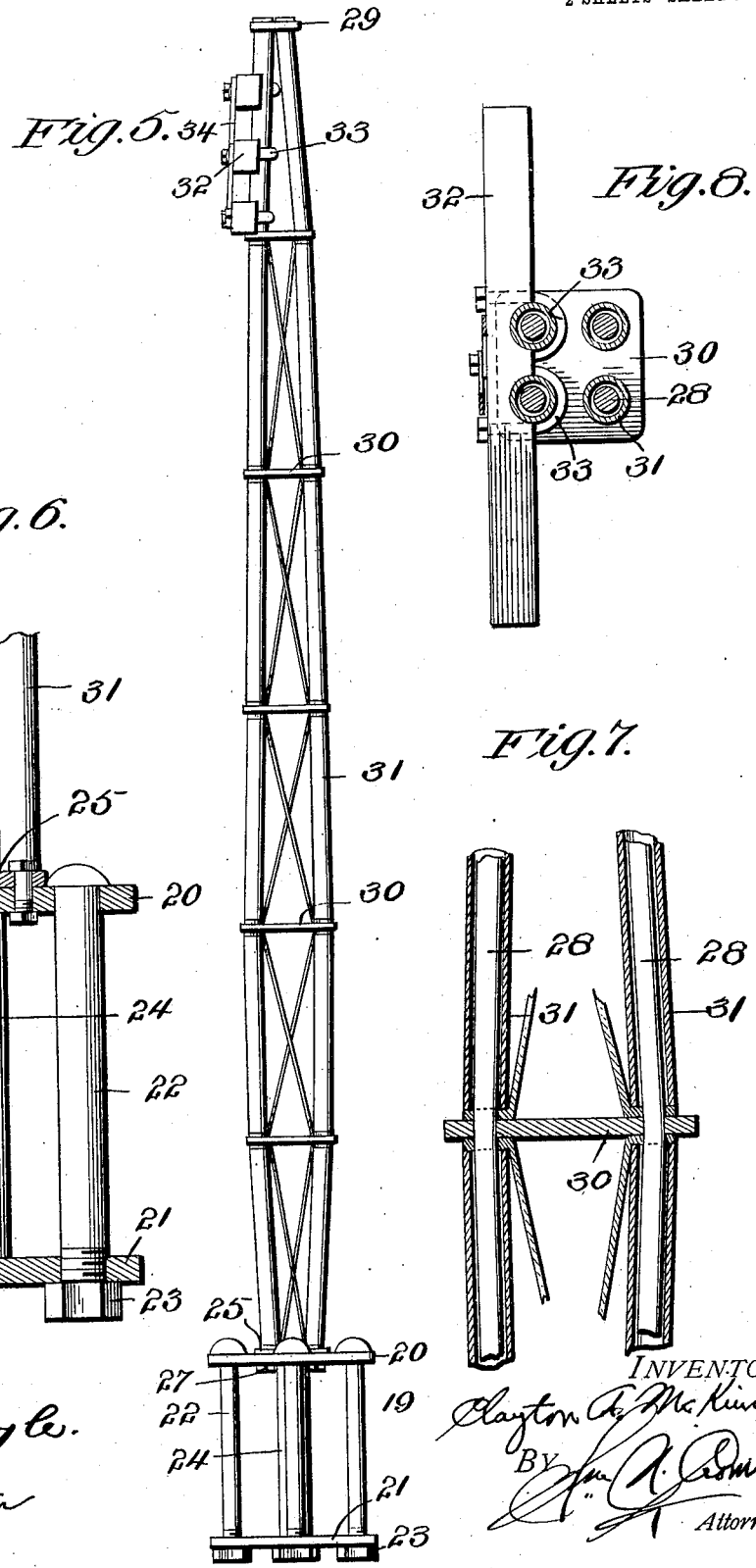

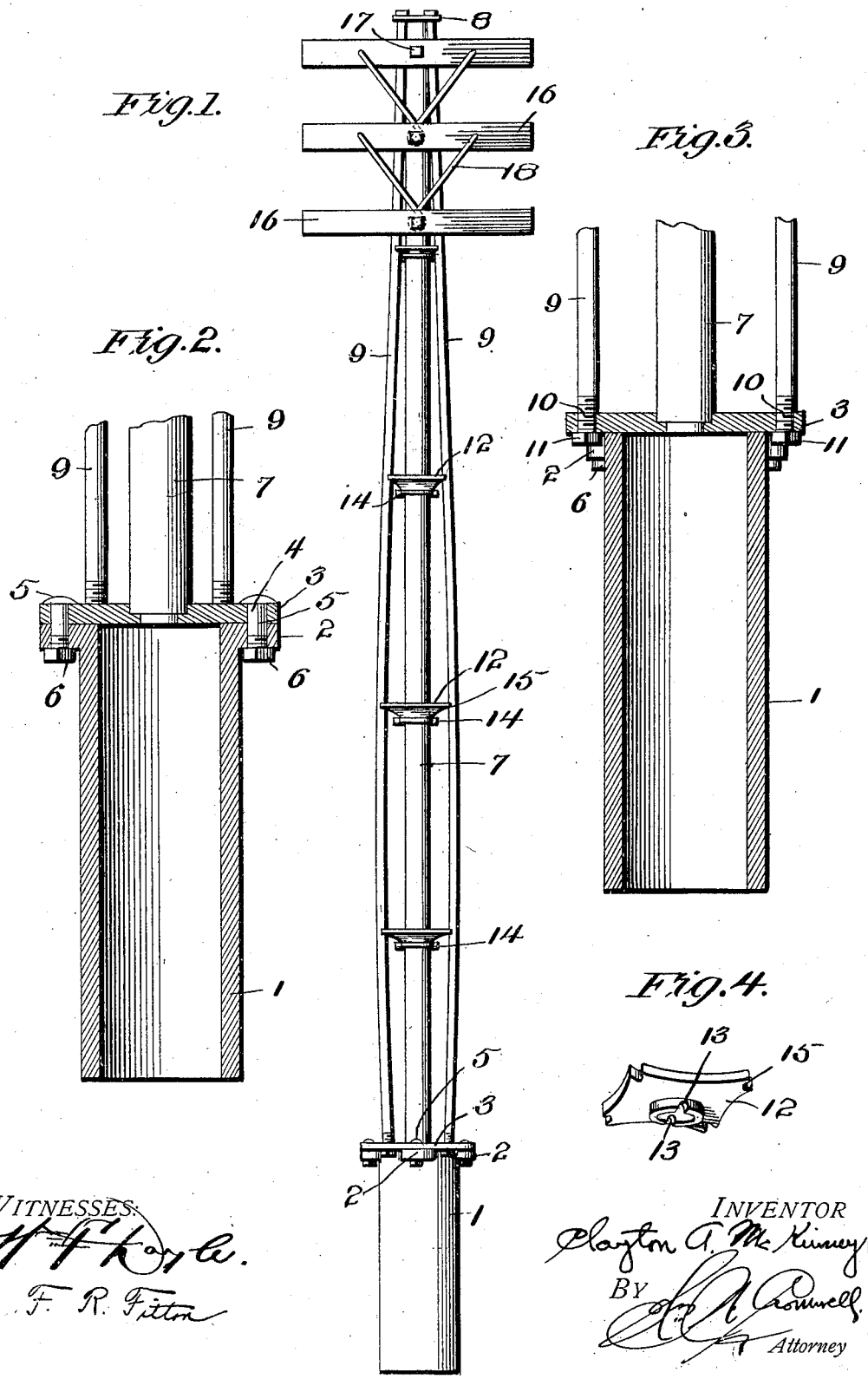

UNITED STATES PATENT OFFICE.

CLAYTON A. McKINNEY, OF ALTOONA, PENNSYLVANIA, ASSIGNOR OF ONE-HALF TO MARTIN P. BRUMBAUGH, OF ALTOONA, PENNSYLVANIA.

POLE.

No. 832,554.     Specification of Letters Patent.     Patented Oct. 2, 1906.

Application filed May 27, 1905. Serial No. 262,658.

*To all whom it may concern:*

Be it known that I, CLAYTON A. MCKINNEY, a citizen of the United States, residing at Altoona, in the county of Blair and State of Pennsylvania, have invented certain new and useful Improvements in Poles; and I do hereby declare the following to be a full, clear, and exact description of the invention, such as will enable others skilled in the art to which it appertains to make and use the same.

This invention relates to improvements in poles for the support of aerial telegraph, telephone, and electric-light wires, although the same is capable of use in other relations; and it has for its object to provide a pole of the character mentioned which is so constructed as to be formed of metal, thereby eliminating the use of wood, now so commonly employed, and providing a pole which is practically indestructible and of greater life than wooden poles ordinarily used.

With this general object in view and others, which will appear as the nature of the improvements is better understood, the invention consists, substantially, in the novel construction, combination, and arrangement of parts, as will be hereinafter fully described, illustrated in the accompanying drawings, and pointed out in the appended claims.

While the forms of the invention herein shown and described are what are considered preferable embodiments thereof, it will of course be understood that the invention is susceptible of further adaptation and embodiments, and the right is therefore reserved to modify or vary the invention as falls within the spirit and scope thereof.

In the drawings, Figure 1 is a side elevation of a pole constructed in accordance with the present invention. Fig. 2 is a transverse sectional view of the base thereof. Fig. 3 is a similar view taken through the points of connection of opposite longitudinal struts with the base. Fig. 4 is a detail perspective view of one of the spacing-plates. Fig. 5 is a side elevation of another form of the invention. Fig. 6 is a transverse sectional view of the base of the form shown in Fig. 5. Fig. 7 is a similar view of the pole illustrated in Fig. 5, taken through one of the spacing-plates thereof. Fig. 8 is a sectional plan view to illustrate more clearly the manner of connecting the cross-arms with the pole illustrated in Fig. 5.

Referring to the drawings, and more particularly to Figs. 1 to 4, the numeral 1 designates the base of the herein-described pole, said base being preferably cylindrical in form and also preferably formed of metal. The upper end of the base 1 is provided with radially-extending ears 2, which ears are perforated, and mounted upon the upper end of the base 1 is a supporting-plate 3, which plate is also preferably circular in form. The plate 3 is perforated at spaced intervals around its periphery, as at 4, and fitted within the perforations 4 is a series of securing screws or bolts 5, said screws or bolts also passing through the perforations of the ears 2 and being held therein through the medium of nuts 6. It will thus be seen that the supporting-plate 3 is securely held upon the base 1 by the screws 5. Extending upwardly from the supporting-plate 2 is a vertical mast or rod 7, which mast or rod has its lower end fitted in the supporting-plate 3, and arranged upon the upper end of said mast or rod is a cap-plate 8, in which is arranged the headed ends of a series of longitudinally-extending struts or braces 9. The lower ends of said struts or braces are screw-threaded and pass through perforations 10, formed in the plate 2 at points intermediate of the perforations 4, and mounted upon said screw-threaded ends is a series of nuts 11, whereby the lower ends of the struts or braces are held within the supporting-plate, but capable of movement therethrough under the adjustment of said nuts. It will thus be seen that by such adjustment the struts or braces may be tensioned, and thereby effectually brace the mast or rod 7. Arranged at suitable intervals along the mast or rod 7 is a series of spacing-plates 12, which plates are centrally perforated for the passage of the mast or rod and provided around such perforations with depending collars having oppositely-formed notches 13 arranged therein, and said notches are designed to receive the projecting ends of supporting-pins 14, which are inserted transversely of the mast or rod 7 in accordance with the distance it is desired to space the plates 12. Thus it will be seen that said plates are prevented rotating about the mast or rod 7, and the corners of said plates are also notched, as at 15, for the reception of the longitudinal struts or braces 9. The spacing-plates 12 may be so located as to provide steps to facilitate climbing the pole. The numeral 16 designates the cross arms or trees upon which the line-wires are strung, said cross-arms being suitably connected to the mast or rod 7 through the medium of bolts 17, and it will also be observed that said arms or trees are held against movement upon their respective bolts through the medium of Y-shaped braces 18, which are looped about the respective bolts 17 and have the free ends of their diverging arms securely fastened to the cross-arms 16.

In Figs. 5 to 8 is disclosed another form of the invention, and referring thereto the numeral 19 designates the base thereof, which is formed of an upper and lower head-plate 20 and 21, respectively, connected through the medium of vertically-arranged headed rods 22, the lower ends of said rods being screw-threaded for the reception of securing-nuts 23, whereby the lower head-plate 21 is held upon said rods. Interposed between the two plates 20 and 21 is a standard 24, the upper end of which is provided with a supporting-plate 25, and said standard passes centrally through the upper head-plate 20, so that the supporting-plate 25 of said standard rests upon the upper head-plate 20. To secure the supporting-plate 25 to the plate 20, a series of bolts 26 is employed, upon which are mounted nuts 27, and it will thus be seen that through the medium of said bolts the plates 20 and 25 are held in fixed relation to each other. Projecting upwardly from the supporting-plate 25 is a series of longitudinal struts or braces 28, the upper ends of which are connected by a cap-plate 29, and arranged at spaced intervals along the struts or braces 28 is a series of spacing-plates 30. Each of the latter is provided with a perforation through which each of the struts or braces passes, and in order to maintain the spacing-plates separated from each other a sleeve or tube 31 surrounds each of the struts or braces at points intermediate of said plates. The numeral 32 designates the cross arms or trees for the support of the line-wires, and to secure said cross arms or trees to the pole each of the same is provided with a pair of loops or staples 33, which embrace the adjacent sleeve or tube 31. The cross arms or trees 32 may also be further held through the medium of brace-bars 34. To prevent the structure illustrated in Figs. 5 to 8 twisting, a series of diagonal braces 35 is interposed between the plates 30, said braces having perforated lugs 36 at their ends for receiving the struts 28, whereby the braces are held in fixed relation to the struts.

Having thus described the invention, what is claimed as new, and desired to be secured by Letters Patent, is—

1. In a pole of the class described, the combination with a base, of a supporting-plate arranged thereon, a series of longitudinally-extending struts or braces connected to said plate, and screws passing through said supporting-plate and the base for securing said plate to said base.

2. In a pole of the class described, the combination with a base, of a supporting-plate arranged thereon, a series of longitudinally-extending struts or braces connected to said plate, a series of spacing-plates arranged upon said struts or braces, and screws passing through said supporting-plate and the base for securing said plate to said base.

In testimony whereof I affix my signature in the presence of two witnesses.

CLAYTON A. McKINNEY.

Witnesses:
G. H. WEISS,
W. I. ISENBERG.